Figure 1:
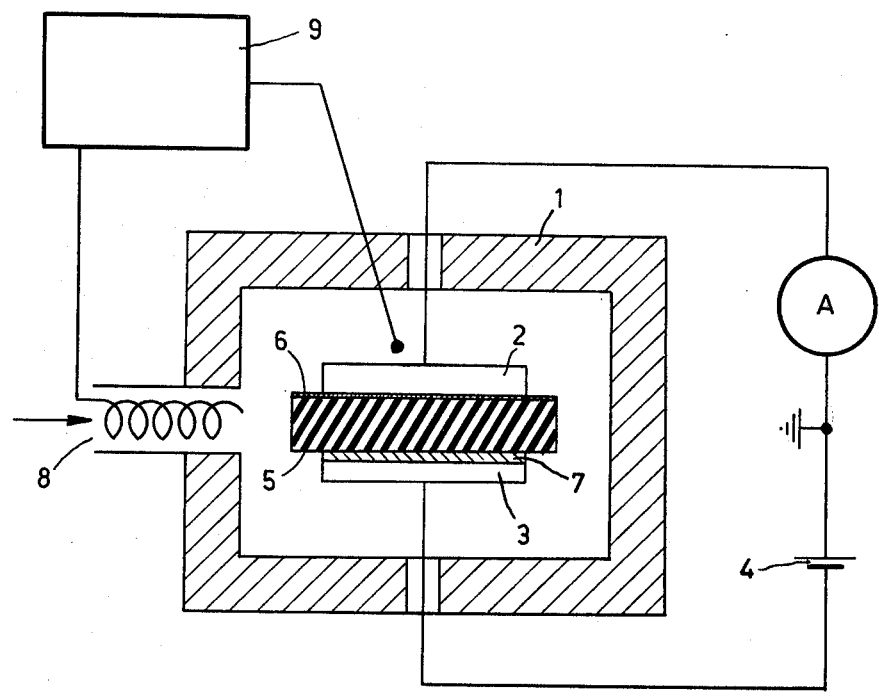

United States Patent [19]
van Turnhout

[11] 4,037,310
[45] July 26, 1977

[54] METHOD OF MANUFACTURING A HOMOPOLAR ELECTRET FROM A FOIL
[75] Inventor: Jan van Turnhout, Delft, Netherlands
[73] Assignee: U.S. Philips Corporation, New York, N.Y.
[21] Appl. No.: 558,936
[22] Filed: Mar. 17, 1975
[30] Foreign Application Priority Data
  Mar. 25, 1974  Netherlands ............... 7403965
[51] Int. Cl.² ........................................ B05D 5/12
[52] U.S. Cl. ........................ 29/592; 307/88 ET; 179/100.41 B; 179/111 E; 361/225
[58] Field of Search .............. 29/592, 592 E, 25.41, 29/25.42; 317/262; 307/88 ET; 179/111 E, 100.41 B; 340/173 PP; 161/216; 204/157.1 R, 157.1 H, 164; 427/78, 80, 81, 372, 379, 398, 374

[56] References Cited
U.S. PATENT DOCUMENTS
3,449,094  6/1969  Baxt et al. .................. 307/88 ET
3,660,736  5/1972  Igarashi et al. ............. 307/88 ET X
3,885,301  5/1975  Murayama .................... 29/592

Primary Examiner—C.W. Lanham
Assistant Examiner—Daniel C. Crane
Attorney, Agent, or Firm—Frank R. Trifari; Bernard Franzblau

[57] ABSTRACT

A method of manufacturing a homopolar electret from a foil of a non-polar polymer, preferably TEFLON-FEP or PFA. The polymer foil is formed into an electret by heating it above the transition temperature and below the melting temperature of the polymer under the influence of an electrostatic field of a magnitude such that a homopolar charge is injected into the foil which is greater than the desired value, and the foil then being cooled to room temperature. However, before the transition temperature is reached during cooling, the electrostatic field is switched off so that the charge surplus is thereby removed.

If the foil is disposed between two electrodes, a better result can be obtained by providing the foil with a vacuum-deposited metal layer in contact with the positive electrode during the formation.

The charging time lies between 0.02 secs. and 1 min. and is preferably smaller than 5 secs.

15 Claims, 4 Drawing Figures

METHOD OF MANUFACTURING A HOMOPOLAR ELECTRET FROM A FOIL

The invention relates to a method of manufacturing a homoplanar electret from a foil of a non-polar polymer which after heating above the glass-rubber transition and below the melting termperature of the polymer is formed in an electrostatic field, the foil being cooled to room temperature.

Such electrets are provided with a homopolar charge by injection of charges which are formed outside the dielectric.

When electrodes are used, the foil being arranged between two opposite electrodes which are connected to a direct voltage source, the electrostatic field is increased so as to cause the breakdown in the layer of air between the foil and one of the electrodes, whereupon ions and electrons are produced which are injected into the foil material by the electrostatic field.

Other possibilities of injecting a homopolar charge into the foil are the use of the corona effect, the use of liquid as a charge reservoir and the use of an electron bombardment in vacuum.

It has been found that non-polar dielectrics are eminently suited for the storage of a homopolar charge. They are characterized by an extremely low electrical conductance and a low affinity to moisture.

Typical examples of non-polar polymers are polymerized fluorine-carbon compounds, which are marketed under the trade name TEFLON.

The electret foils made of said materials exhibit a good thermal stability.

It is an object of the invention to manufacture electret foils of said materials with an exceptional thermal and moisture stability and the invention is characterized in that before the glassrubber transition temperature is reached during cooling, the electrostatic field switched off. The electrostatic field has such a magnitude that a homopolar charge is injected into the electret foil which is greater than the desired value, the charge surplus being removed after the field has been switched off.

This allows the less strongly bound charge in the foil to be drained after the homopolar charge injection owing to the high temperature. The injected charge is retained in traps of different energy. After charging and at the selected high temperature the charges migrate from the outside to the inside of the foil, i.e. from those traps where the charges have the weakest bonds. This is probably a result of an increase of the mobility of the charge owing to the high temperature. The higher said temperature is, the easier the charge transport is. The length of time during which the electret foil is kept at a higher temperature also plays a part. The longer this time is, the more charges will move inwards. Only those charges of the electret foil remain which are located in the so-called deeper traps, for these are the most strongly bound.

As moisture can only penetrate the electret foil to a very small depth, its influence on the homopolar charge, at least on the strongly bound charges (charges in the deeper energy traps), is practically negligible. The electret foil thus formed has an exceptionally good thermal stability owing to this "ageing" process and, moreover, exhibits a high charge-stability against moisture.

A modification of the method according to the invention is characterized in that after termination of the charging process the temperature is raised still further. This allows a substantially more rapid removal of the weakly-bound charge.

Experiments have revealed that the charging time should lie between 0.01 sec and 1 min., preferably between 0.1 and 5 secs.

During manufacture of the electret according to the invention the electrostatic field is brought to a certain value. The homopolar charge thus obtained is substantially higher — for example 50% — than the desired charge. Removal of the excess charge takes place owing the selected temperature and the duration thereof. Said removal is to be understood to mean the reduction of the charge as described previously.

In the method according to the invention it is advantageous that the foil be disposed between two oppositely situated electrodes, of which at least one electrode is provided with a tissue-like intermediate layer, the electrodes being connected to a direct voltage source during the charge formation. Frequently, a foil with a vacuum-deposited non-oxidizing metal layer is used, such as gold or nickel-chromium. When said foil consists of the previously mentioned TEFLON material, it has been found that said material exhibits a substantially better charge stability when provided with a negative homopolar charge than when provided with a positive charge.

In order to manufacture such an electret foil with a negative charge, an embodiment of the method is characterized in that when the foil is disposed between the electrodes the metal layer of the foil is in direct contact with an electrode, which electrode is connected to the positive terminal of the direct voltage source, the intermediate layer being disposed between the foil and the other electrode.

The invention will be described in more detail with reference to the drawing.

Figure 2:
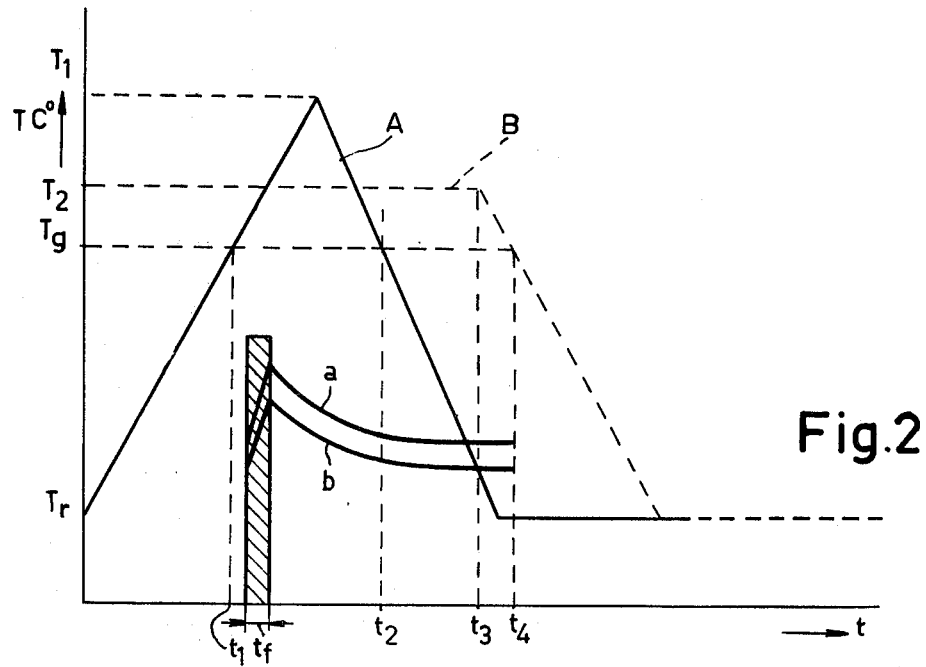

Said drawing includes the following Figures, of which:

FIG. 1 schematically shows a device for the formation of an electret according to the invention;

FIG. 2 schematically represents the formation process; and

Figure 3A:
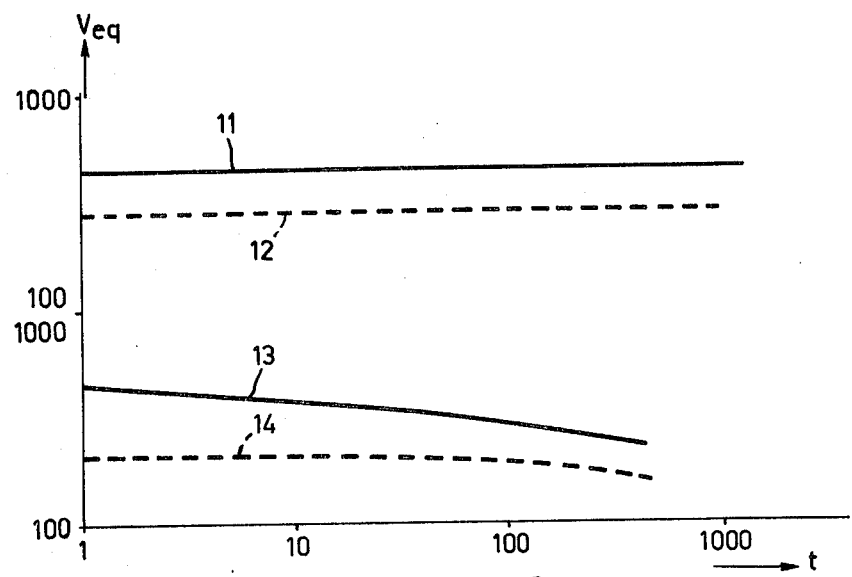
Figure 3B:
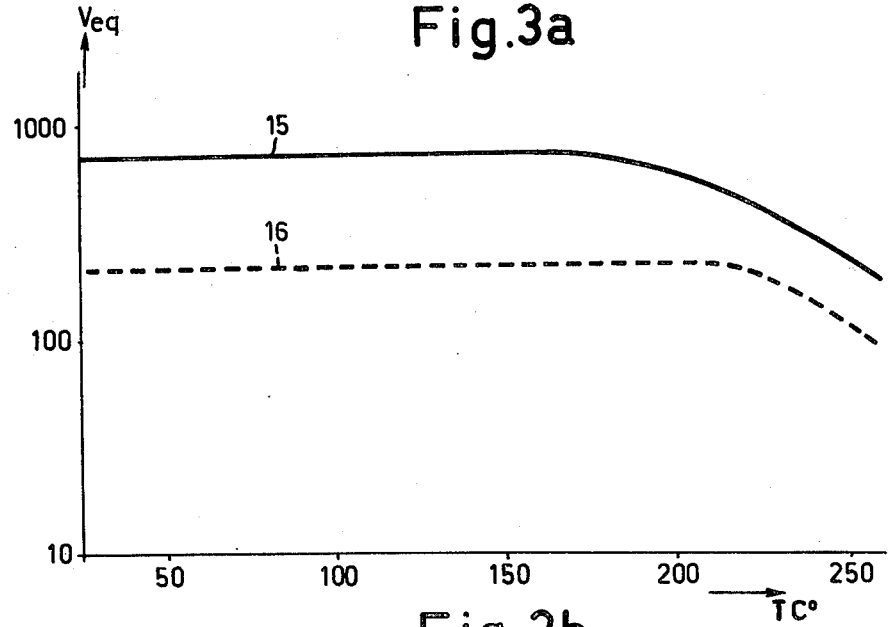

FIGS. 3a and 3b show some experimentally determined stability curves of an electret foil manufactured using the formation method according to invention.

FIG. 1 shows a thermostat 1 in which two oppositely disposed electrodes 2 and 3 are arranged, which electrodes are connected to the voltage source 4, electrode 2 being the positive terminal and electrode 3 the negative terminal. Between the electrodes a foil 5 composed of, for example, the said TEFLON-FEP material is disposed. Said foil is at one side provided with a very thin vacuum-deposited metal layer 6 of Nichrome, which does not substantially oxidize in a humid atmosphere. Said metal layer is fully in contact with the positive electrode 2.

Between the foil 5 and the negative electrode 3 an intermediate layer 7 of glass-fabric is disposed. The foil 5 is clamped between the electrodes. The thermostat 1 is provided with a heating spiral 8, along which air is blown into the thermostat in accordance with the arrow, and it is further provided with a temperature control 9.

The thickness of the foil is 25 $\mu$m. The thickness of the glass fabric is 0.25 mm. As a result, an electric breakdown is possible. In the intermediate layer 7, i.e. in the air cavities in the glass fabric, ions and electrons are obtained which, as a result of the electrostatic field, are injected into the foil and thus form a homopolar charge.

The temperature-time programme which is applied is represented in FIG. 2. The temperature is raised to a certain empirically determined maximum temperature $T_1$, which should lie above the glassrubber transition $T_g$ and below the melting temperature of the foil. Between the instants $t_1$ and $t_2$ which correspond to the glass-rubber transition termperature $T_g$ and which are situated in the heating and in the cooling interval of the temperature cycle respectively, the electrodes 2 and 3 are connected to a voltage source 4, so that during a time $t_f$ an electrostatic field is set up between the electrodes and thus in the foil material. The magnitude thereof is determined by the amount of charge to be administered to the foil.

The temperature curve is designated A. The associated charging curve a shows that between the instants $t_1$ and $t_2$ a part of the charge is drained. The magnitude thereof is determined by the maximum temperature $T_1$ and the difference in time $(t_2 - t_1)$. Another formation possibility is represented by the curve B, the maximum temperature $T_2$ being maintained constant until the instant $t_3$. The charge which is formed varies in accordance with curve b. The charge drain is now prolonged till the instant $t_4$, whichinstant corresponds to the glass-rubber transition temperature and is situated in the cooling range of curve B.

After this process of charge drainage both the thermal charge stability and the moisture stability appear to be substantially improved.

The stability curves are measured by means of the TSD-method (thermally stimulated discharge). The formed electret foil is then heated by one degree Celcius per minute, the amount of charge being measured continually. This is effected in accordance with the so-called compensation method and in view of this the measured homopolar charge is expressed in equivalent volt units $V_{eq}$.

FIG. 3a shows the stability curves of a TEFLON-FEP electret foil under normal conditions (curves 11 and 12) and special conditions with respect to moisture (curves 13 and 14). The normal conditions are: 22° C - 40% RH; the special conditions are: 70°- 100% RH. The homopolar charge is plotted vertically in $V_{eq}$ volt units and the time horizontally in days.

The aged electret foil formed in accordance with the method according to the invention, which is represented by the dashed curves, has been formed for 1 minute with a direct voltage of 1 kV at 200° C, after which the temperatures was raised to a maximum temperature $T_1 = 220°$ C.

The non-aged foil — represented by the uninterrupted curves — is formed in accordance with a known method, the direct voltage not being switched off until after cooling down to room temperature.

FIG. 3b shows the stability curves as a function of the temperature. Curve 15 in accordance with a non-ageing process, curve 16 in accordance with the ageing process according to the invention, which curves extends further.

The curves clearly show that the stability curves of aged electret foil at the high humidity of 100% RH and 70° C are appreciably better than those of the non-aged electret foil. Said extremely unfavourable conditions, however, will never occur in practice when an electret foil is employed as a diaphragm in a microphone.

Measurements on TEFLON-FEP foils have resulted in the following data:

| normal conditions | type of electret | charge loss % | time |
|---|---|---|---|
| 45° C - 100% RH | non-aged | 6.7 | 4.5 years |
|  | non-aged | 11 | 1 year |
|  | aged | 4.5 | 1 year |
| 70° C - 100% RH | non-aged | 46 | 2 years |
|  | aged | 30 |  |

What is claimed is:

1. A method for producing a homopolar electret from a foil of a non-polar polymer which comprises, heating said foil to a temperature above the glass-rubber transition temperature but below the melting temperature of the polymer and applying an electrostatic field thereto of a magnitude such that a homopolar charge is injected into the foil which is greater than the desired charge value thereby to form an electret foil, cooling the foil to room temperature but removing the electrostatic field before said glass-rubber transition temperature is reached whereby the surplus charge is removed from the electret foil after removal of the field.

2. A method as claimed in claim 1 which comprises increasing the temperature still further after termination of charging the electret foil.

3. A method as claimed in claim 1 characterized in that the charging time of the foil lies between 0.01 sec. and 1 min.

4. A method as claimed in claim 3, characterized in that the foil charging time is less than 5 secs.

5. A method as claimed in claim 1, characterized in that the foil is disposed between two oppositely situated electrodes wherein at least one electrode is provided with a tissue-like intermediate layer, the electrodes being connected to a direct voltage source during the formation of the electret foil.

6. A method as claimed in claim 5 wherein the foil of a non-polar polymer is comprised of polymerized fluorine-carbon compounds, said foil being provided with a very thin vacuum-deposited metal layer at one side, characterized in that when the foil is disposed between the electrodes the metal layer of the foil is in direct contact with an electrode which is connected to the positive terminal of the direct voltage source, the intermediate layer being disposed between the foil and the other electrode.

7. A method of making a homopolar electret from a foil of non-polar polymer material which comprises, heating the foil to a temperature above the glass-rubber transition temperature but below the melting temperature of the polymer during a given time interval, applying, during a part of said given time interval, an electrostatic field to the foil of a magnitude sufficient to inject a homopolar charge into the foil which is greater than the desired charge value thereby to polarize the foil and form an electret, removing the electrostatic field from the foil during a second part of said given time interval thereby to drain off the excess charge from the electret foil, and cooling the electret foil to room temperature.

8. A method as claimed in claim 7 wherein said part of the given time interval lies between 0.01 second and 1.0 minute.

9. A method as claimed in claim 8 further comprising heating the foil to a higher temperature subsequent to the polarization of the foil and during the given time interval.

10. A method as claimed in claim 7 wherein said part of the given time interval lies between 0.1 second and 5.0 seconds.

11. A method as claimed in claim 7 wherein the foil is disposed between two opposed spaced apart electrodes connected to a source of DC voltage during said part of the given time interval for applying the electrostatic field of the foil, one electrode having a thin intermediate layer of material between said one electrode and the foil, the DC voltage being of a magnitude to ionize the air between said one electrode and the foil thereby to form a homopolar charge in the foil.

12. A method as claimed in claim 11 wherein said intermediate layer is composed of a glass fabric.

13. A method as claimed in claim 7 wherein the foil is polarized for 1 minute at a temperature 200° C and then further comprising heating the foil to a temperature of approximately 220° C during said given time interval.

14. A method as claimed in claim 7 wherein the length of time of said second part of the given time interval is determined by the amount of excess charge to be drained off from the electret foil.

15. An electret foil comprising a thin body of dielectric polymer material having two substantially parallel surfaces, one of said surfaces having adhered thereto a metal layer, said dielectric material having a homopolar charge formed therein by heating the dielectric material to a temperature above the glass-rubber transition temperature but below the melting temperature of the polymer, applying an electrostatic field to the dielectric material of a magnitude to inject a homopolar charge into the foil greater than the desired charge value while the dielectric material is held above said transition temperature and removing the field before the dielectric material is cooled down to the transition temperature thereby to remove any surplus formed in the dielectric material while the field was applied thereto.

* * * * *

UNITED STATES PATENT AND TRADEMARK OFFICE
CERTIFICATE OF CORRECTION

PATENT NO. : 4,037,310
DATED : July 26, 1977
INVENTOR(S) : JAN VAN TURNHOUT

It is certified that error appears in the above-identified patent and that said Letters Patent are hereby corrected as shown below:

Col. 3, line 15, after "time" the word --period-- should be inserted;

line 28, "whichinstant" should be --which instant--;

line 56, before "foil" the word "electret" should be inserted.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks